(12) United States Patent
Bache

(10) Patent No.: US 6,365,045 B1
(45) Date of Patent: Apr. 2, 2002

(54) APPARATUS FOR USE IN A SEWAGE TREATMENT PLANT

(75) Inventor: John Cedric Bache, Stourbridge (GB)

(73) Assignee: Jones & Attwood Limited (GB)

( * ) Notice: Subject to any disclaimer, the term of this patent is extended or adjusted under 35 U.S.C. 154(b) by 0 days.

(21) Appl. No.: 09/638,818

(22) Filed: Aug. 14, 2000

(30) Foreign Application Priority Data

Aug. 13, 1999 (GB) .............................................. 9919183

(51) Int. Cl.[7] .......................... B01D 21/02; B01D 33/04
(52) U.S. Cl. ...................... 210/256; 210/299; 210/301; 210/302; 210/312; 210/400; 210/526; 210/532.1
(58) Field of Search ................................ 210/256, 258, 210/259, 261, 299, 301, 302, 307, 312, 526, 532.1, 534, 400

(56) References Cited

U.S. PATENT DOCUMENTS

| 1,748,151 | A | * | 2/1930 | Stehling ...................... 210/526 |
| 1,820,976 | A | * | 9/1931 | Imhoff ......................... 210/526 |
| 2,267,086 | A | * | 12/1941 | Donohue .................... 210/526 |
| 3,754,661 | A | * | 8/1973 | Palmer et al. .............. 210/526 |
| 4,421,647 | A |  | 12/1983 | Estabrook et al. |
| 4,971,693 | A | * | 11/1990 | Akesaka ...................... 210/526 |
| 5,256,290 | A | * | 10/1993 | Becker et al. ............... 210/400 |
| 5,387,336 | A |  | 2/1995 | Bormet et al. |
| 5,603,846 | A | * | 2/1997 | Uchiyama et al. .......... 210/526 |
| 5,738,782 | A | * | 4/1998 | Schäfer et al. .............. 210/526 |
| 5,770,092 | A |  | 6/1998 | Sharir |
| 5,827,425 | A |  | 10/1998 | McKinnon |

FOREIGN PATENT DOCUMENTS

| EP | 0 557 030 | 8/1993 |
| EP | 0 563 754 | 10/1993 |
| GB | 2 039 769 | 8/1980 |
| GB | 2 261 612 | 5/1993 |
| WO | 88 04570 | 6/1988 |

* cited by examiner

Primary Examiner—Christopher Upton
(74) Attorney, Agent, or Firm—Andrus, Sceales, Starke & Sawall

(57) ABSTRACT

An apparatus for use in a sewage treatment plant comprises a settlement tank, an inlet channel for delivering an input sewage flow to the settlement tank, and a screen arrangement having a continuous belt screen for capturing screenings contained within the sewage flow to enable their subsequent removal therefrom. The screen arrangement is arranged within the settlement tank.

20 Claims, 4 Drawing Sheets

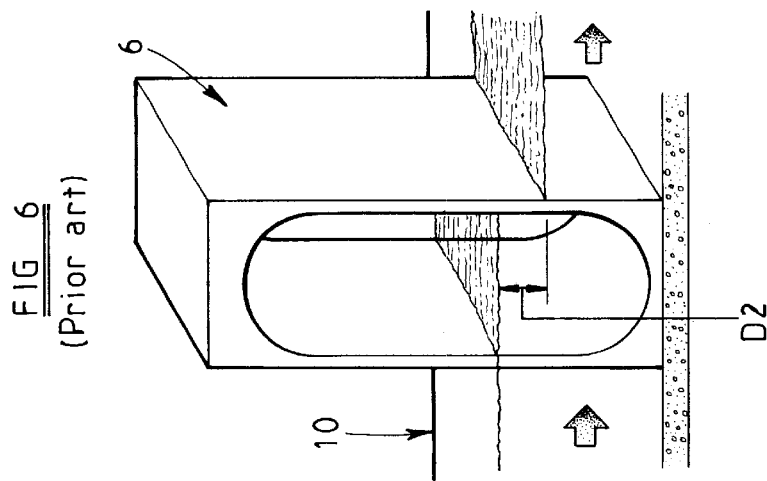
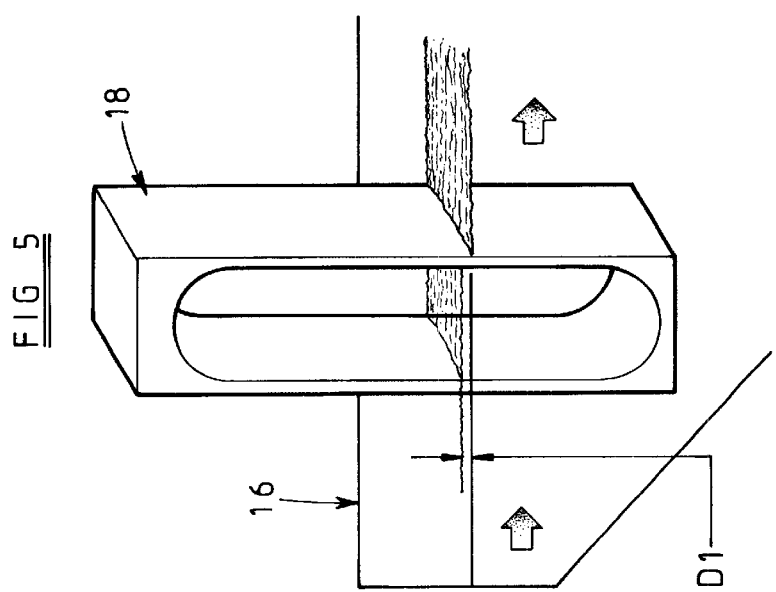
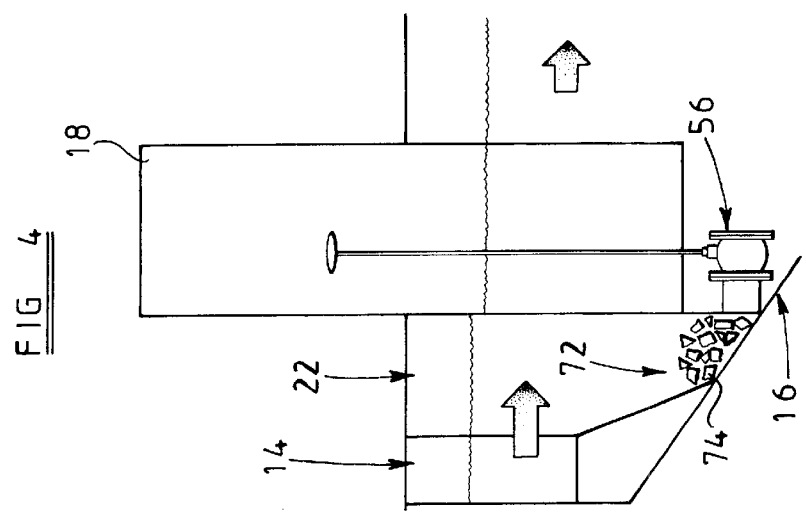

APPARATUS FOR USE IN A SEWAGE TREATMENT PLANT

The invention relates to an apparatus for use in a sewage treatment plant.

Effluent flow entering a sewage treatment plant contains solid materials, such as rags, paper, polythene and other plastic sheeting, and the like, which cannot be processed by the treatment plant. Solids can be removed from the flow by screens or sieves which capture the solids. The screens or sieves are then periodically or continuously operated for cleaning to remove the captured solids, commonly referred to as screenings, for disposal. One such screening apparatus known in the art is the "continuous-belt screen" which includes a continuous driven belt screen presenting a continuous, moving screening area to the input sewage flow to effect removal of screenings within the sewage flow. The belt screen removes any solid materials carried by the input sewage flow whilst permitting the liquid phase of the sewage to flow onwards to the subsequent processing stages of the treatment plant.

In any sewage processing apparatus, it is desirable to reduce the head loss (i.e. the difference in sewage flow level between the flow upstream of the screening apparatus and the flow downstream of the screening apparatus) as this permits higher sewage flow rates to be screened with increased efficiency. The head loss is determined by the screening area which is presented to the input flow; the smaller the screening area presented to the input flow, the greater the head loss and the less efficient the apparatus at higher flow rates.

In conventional arrangements, as shown in FIG. 6, the continuous belt screen 6 is located in an inlet channel 10 which delivers the sewage flow 12 to the inlet stage, or inlet works, of the sewage treatment plant where the inlet sewage flow is screened. Following the inlet stage, screened sewage is passed through a grit removal facility, where grit and other small stones are removed from the sewage flow. The screened sewage is then delivered to the subsequent sewage processing stages. However, as the depth of the inlet channel 10 is limited, only a limited screening area is presented to the sewage flow 12 and the head loss, represented by $D_2$, is significant. Such arrangements therefore tend to be inefficient, especially at higher flow rates.

In order to overcome this problem, several continuous belt screens may be accommodated in parallel within one or more inlet channels, thereby reducing the total head loss through the apparatus. However, as this solution requires many belt screens to be installed, the cost of the apparatus is increased. A greater installation space is also required for the apparatus. Alternatively, in some installations it is possible to provide a depression in the floor of the inlet channel, the belt screen being located in the depression so as to present a larger screening area to the input flow. However, it is not usually possible to provide depressions in many existing installations where belt screens are arranged in the inlet channel due to the location of the inlet channel at ground level. Additionally, providing such a depression in the inlet channel leads to a reduced flow velocity which can cause settlement of debris in front of the screening apparatus.

It is an object of the present invention to provide an apparatus for use in a sewage treatment plant which alleviates these disadvantages.

According to the present invention, there is provided an apparatus for use in a sewage treatment plant including a settlement tank, an inlet channel for delivering an input sewage flow to the settlement tank, and a screen arrangement having a continuous belt screen for capturing screenings contained within the sewage flow to enable their subsequent removal therefrom, wherein the screen arrangement is arranged within the settlement tank.

Conveniently, the apparatus may be used in an inlet stage, or inlet works, of a sewage treatment plant.

The apparatus provides the advantage that, as the settlement tank has a large volume and as the screen arrangement is arranged within the settlement tank, the screening area presented to the input sewage flow is greatly increased. Thus, the head loss can be reduced, or substantially eliminated, compared to known arrangements in which the screen arrangement is arranged within the inlet channel. In this way, the efficiency of the apparatus can be improved and the cost of installation can be reduced.

The settlement tank may comprise an inlet chamber, the input sewage flow being delivered to the inlet chamber by the inlet channel. The inlet chamber may deliver the sewage flow directly to the screen arrangement or may deliver the sewage flow to the screen arrangement through a transition channel. The transition channel or the inlet chamber may be provided with means for isolating the screen arrangement from the sewage flow, for example a stop-gate.

Conveniently, the floor of the inlet chamber is raised above the floor of the settlement tank. The floor of the inlet chamber may be provided with a recess or depression for retaining stones or rocks contained within the sewage flow prior to delivery of the flow to the screen arrangement. The inlet chamber may also be provided with means for removing stones or rocks retained within the recess or depression. Removal of stones or rocks from the sewage flow prevents damage being caused to the screen arrangement and any screenings washing apparatus located downstream of the screen arrangement.

Alternatively, if a transition channel is provided, the floor of the transition channel may be raised above the floor of the settlement tank, the recess or depression for retaining stones or rocks contained within the sewage flow being provided in the transition channel.

The apparatus may further comprise a removal apparatus for removing settled products, such as grit and small stones, from the settlement tank. The removal apparatus may be a pumping apparatus. The apparatus may also include a separation apparatus for separating grit and small stones removed from the settlement tank from other products, such as vegetable products and other relatively fine particles of solid sewage materials, which may settle in the settlement tank.

The apparatus may further comprise a washing apparatus for washing screenings removed from the sewage flow by the screen arrangement. The settlement tank may be provided with an outlet weir, over which screened, and preferably de-gritted, sewage is discharged to an outlet chamber, the walls of the outlet chamber and the settlement tank being formed from the same housing. The settlement tank and the outlet chamber may be covered. The washing apparatus and, if present, the separation apparatus may be supported on or above the covering. Thus, a reduced installation space is required to accommodate the complete apparatus.

The invention will now be described, by way of example only, with reference to the accompanying drawings in which;

FIG. 4 is a schematic side view of a part of an alternative embodiment of the invention, including a stone collection region;

FIGS. 5 and 6 are a schematic side views of the present invention and the prior art respectively, to give a comparative illustration of head loss.

Figure 1:
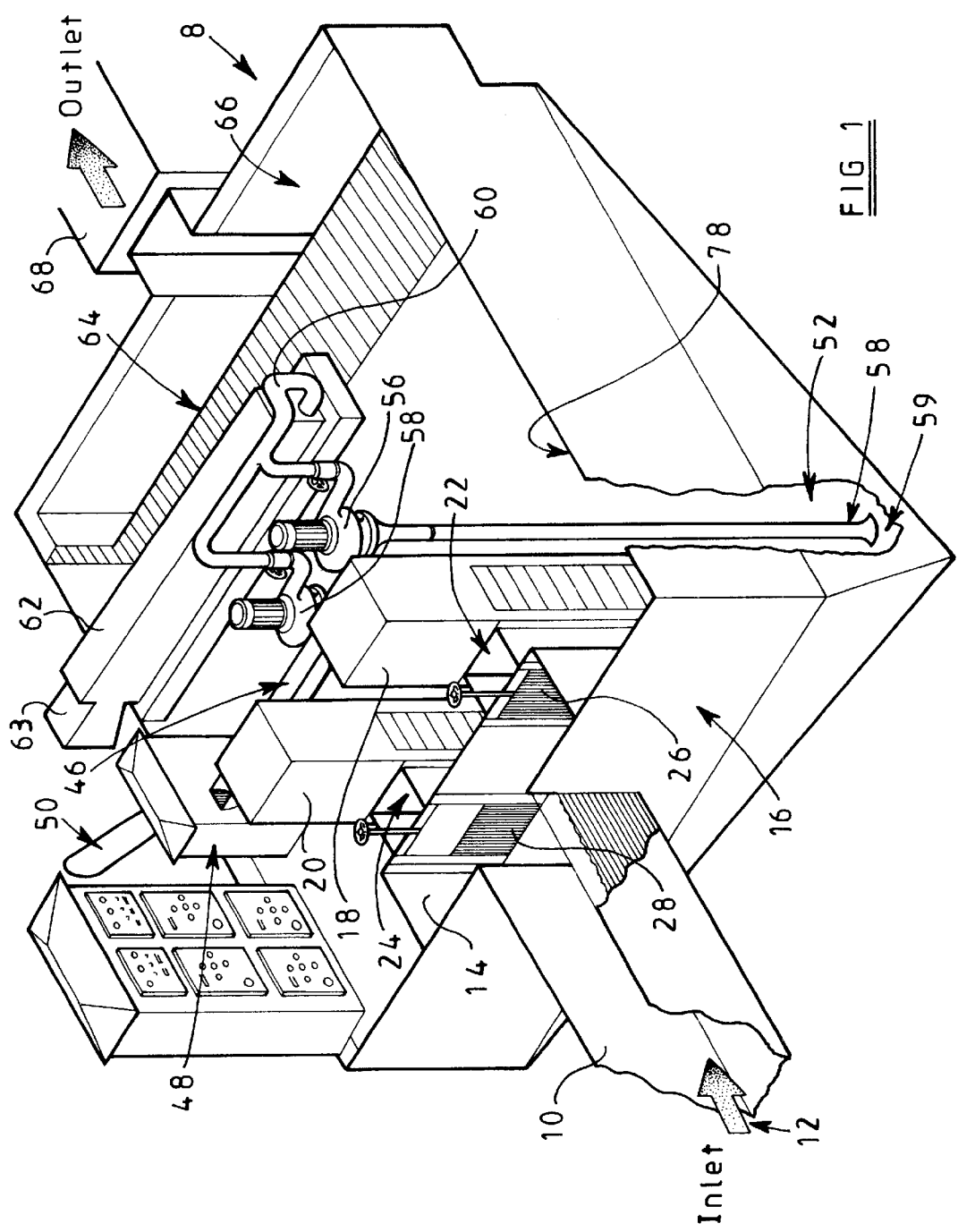
FIG. 1 is a perspective view of the apparatus of the present invention.
Figure 2:
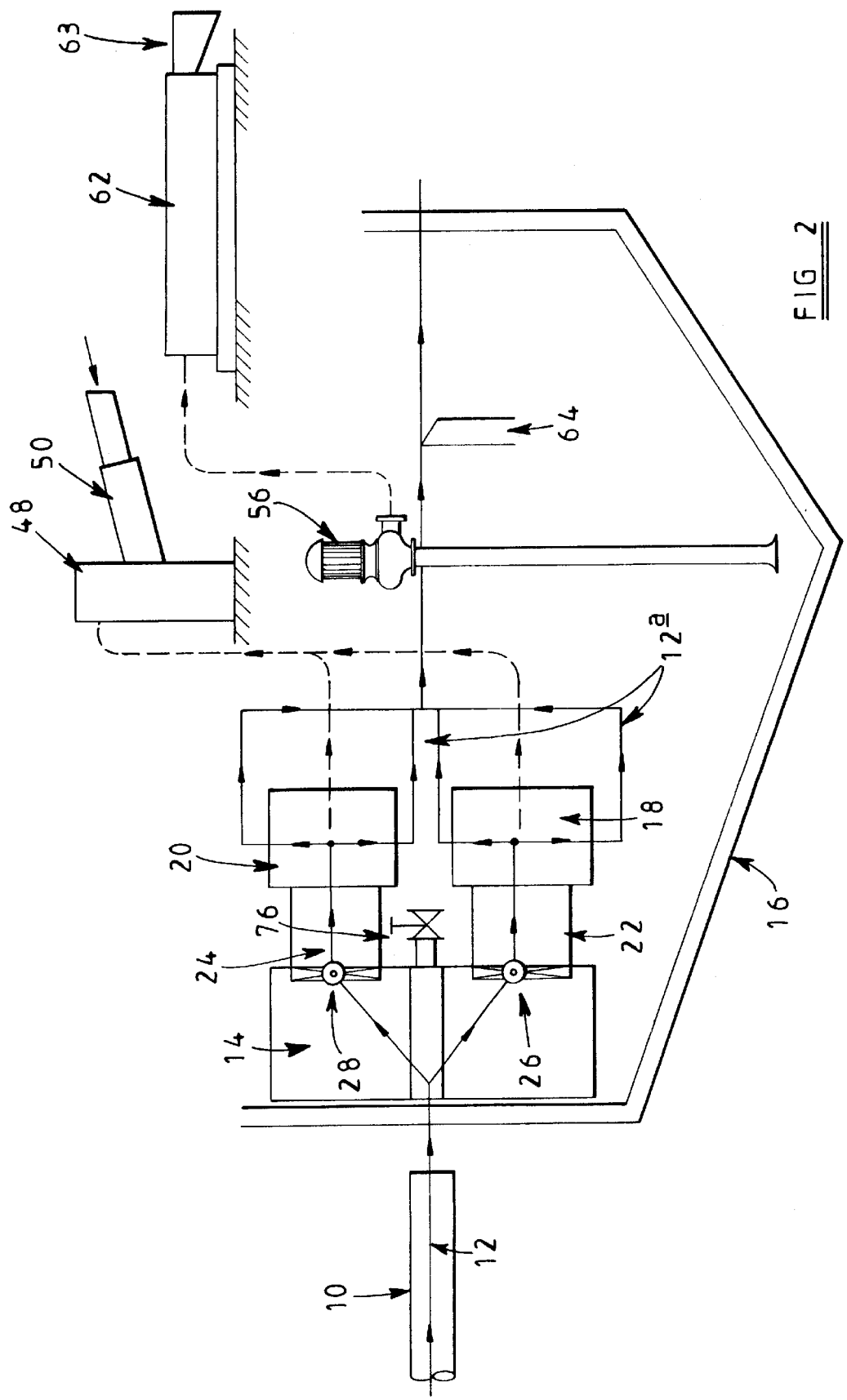
FIG. 2 is a plan view of the apparatus shown in FIG. 1.

Referring to FIGS. 1 and 2, a sewage processing apparatus, referred to generally as 8, includes an inlet channel 10 for delivering a sewage flow, represented by arrow 12, to an inlet chamber 14 forming part of a main settlement tank 16, commonly referred to as the "grit settlement tank". The inlet channel 10 forms a bridge structure such that the floor level of the inlet channel 10 is raised above the floor level of the grit settlement tank 16, as can be seen most clearly in FIG. 1. The apparatus 8 also includes first and second screen arrangements 18,20, sewage flow being delivered to the screen arrangements 18,20 through respective transition channels 22,24 which communicate with the inlet chamber 14. Each of the transition channels 22,24 is provided with a respective stop-gate 26,28, the stop-gates being operable independently between a closed position, in which sewage flow within the inlet chamber 14 is isolated from the respective transition channel 22,24, and an open position in which sewage flow within the inlet chamber 14 is able to flow into the respective transition channel 22,24. Thus, for reduced sewage flow rates entering the sewage treatment plant, it is possible to direct the sewage flow through only one screen arrangement 18,20 by closing one of the stop-gates 26,28.

Figure 3:
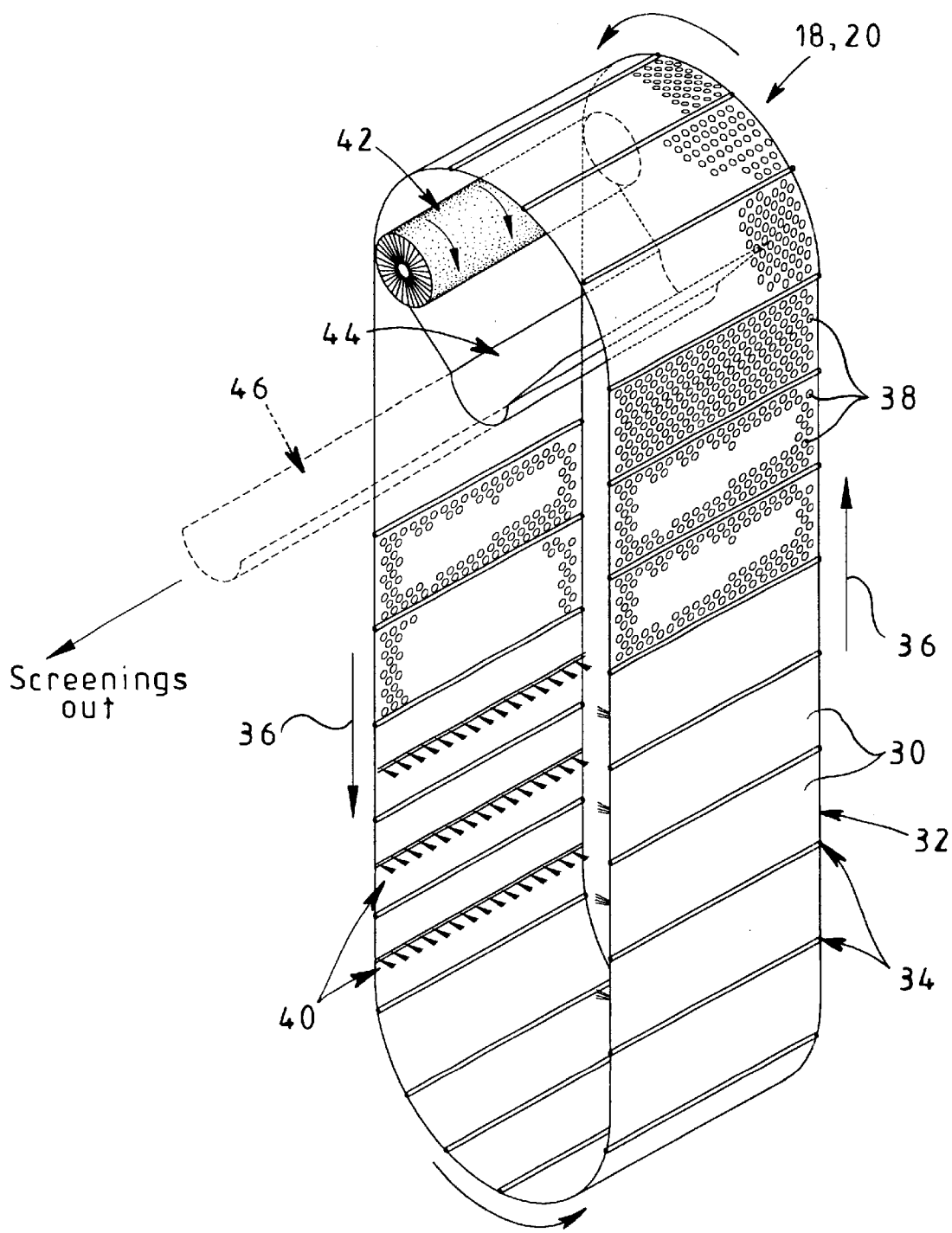
FIG. 3 is a perspective view of a conventional screen arrangement which may form part of the apparatus in FIGS. 1 and 2.

The screening arrangements 18,20 present a screening area to the sewage flow which effects removal of screenings, such as rags, papers and plastic materials, from the sewage flow, whilst permitting sewage in the liquid phase to flow to the subsequent stages of the apparatus 8. Referring to FIG. 3, each of the screen arrangements 18,20 may be of a conventional "belt-screen" type, including a number of screen panels 30, the screen panels 30 being connected so as to form a continuous loop providing a belt screen 32, each screen panel 30 being connected to the adjacent screen panels, one on each side, by hinging means 34. Conveniently, the hinging means 34 may be in the form of a series of interdigitated lugs (not shown in detail), arranged along the edge of each panel 30, in which a retaining pin is received, the retaining pin passing through the lugs on adjacent panels 30 to secure adjacent panels together.

The continuous belt screen 32 is driven by a drive mechanism (not shown in the figures) such that the screen panels 30 are conveyed upwardly on one side of the arrangement 18,20 and downwardly on the other side in a direction as indicated by arrows 36. Thus, the screen panels 30 form a continuous belt, driven by the drive mechanism, which presents a substantially continuous, moving screening area to the input sewage flow.

The screen panels 30 are formed from sheets of perforated metal, the perforations 38 of which enable sewage in the liquid phase to pass through the panels 30 to the downstream part of the grit settlement tank 16 and onwards to the subsequent processing stages of the treatment plant. However, the perforations 38 are such that solid materials in the sewage flow, having a greater dimension than the perforations, are captured. The liquid phase of the sewage is therefore passed out from the screen arrangement 18,20, through the continuous belt screen 32 on each side and through a part at the base, whilst the screenings are retained. The passage of liquid sewage through the screen arrangements is indicated by the arrows 12a, as shown in FIG. 2.

Hooks or prongs 40 are arranged internally on the belt screen 32 at spaced locations around the loop. The hooks 40 are usually located between adjoining screen panels 30 and serve to capture the screenings contained within the sewage flow as the belt screen 32 passes continuously therethrough. The screenings may be removed from the belt screen 32 by means of a rotary brush 42 housed within the head space of the screen arrangement 18,20 as they are conveyed through the head space past the rotary brush 42. Each screen arrangement 18,20 also includes a hopper 44 into which captured screenings, which will be contaminated by faecal materials, are dislodged from the belt screen 32 by the rotary brush 42. The screenings removed by the rotary brush 42 are then discharged from the hopper 44 into a launder 46.

As can be seen most clearly in FIG. 1, the screen arrangements 18,20 share a common launder 46 into which screenings removed from the flow by both of the screen arrangements 18,20 are discharged. As the screenings discharged into the common launder 46 will be contaminated by faecal contaminants, the launder 46 carries the screenings to a washing apparatus 48. The washing apparatus 48 may be of the type described in EP 0 557 030, which includes a washing tank into which the screenings are introduced along with aqueous liquid. A washing compound may also be introduced into the washing tank to aid washing of the screenings. A rotating impeller generates turbulence within the aqueous liquid in the tank, resulting in a break down of the faecal contaminants. The washed and compacted screenings are then discharged from the apparatus 48 through an outlet chute 50 which delivers the screenings into an incinerator or to a vehicle for carrying the screenings away from the treatment works. It will be appreciated, however, that alternative means of washing the screenings may be provided instead of the washing apparatus 48 described above.

Due to the large volume of the grit settlement tank 16, the sewage flow introduced into the tank 16 is retained for a sufficient period of time to enable grit, small stones and other relatively high density materials carried by the sewage flow to collect in a settlement region 52 in the lower part of the tank 16, such materials collecting in the settlement region 52 under the effect of gravity. First and second suction pumps, 56,58 (only one of which is shown in FIG. 2) serve to pump these small stones and grit within the settlement region 52 through vertically extending pipes 58 (only one of which is shown in FIG. 1) to a main pipe 60 which delivers the materials to a separation apparatus 62.

The separation apparatus 62 separates different types of product removed from the settlement region 52. For example, the separation apparatus 62 may be arranged to separates grit and small stones pumped through the pipes 58,60 from other materials, such as rags, paper and other fibrous materials, which also settle in the settlement region 52. The apparatus 62 may conveniently be of the type described GB 2261612. The apparatus includes means for washing the grit and small stones, the washed materials being discharged through an outlet channel 63 for safe removal from the site. The rags, paper and other fibrous materials separated to the inlet channel 14 where they are re-introduced to the sewage flow to be passed through the screen arrangements 18,20. The screened sewage flow, including any grease materials, is then passed over an outlet weir 64 into an outlet chamber 66, the screened sewage flow being discharged from the outlet chamber 66 through an outlet channel 68 to the subsequent processing stages of the sewage treatment plant.

Referring to FIG. 4, a stone collection region 72 may be formed in the transition channel 22, larger stones or rocks 74, or other larger, solid materials, which are carried by the sewage flow settling in the region 72 under the effect of gravity. The retention of large stones or rocks in the collection region 72 prevents such materials causing any damage to the screen arrangements 18,20 downstream of the collection region 72. A valve arrangement 76 (as indicated in FIG. 2) may also be provided, opening of the valve arrangement 76 permitting stones or rocks retained within the collection region 72 to be delivered through an outlet pipe to a collection chamber 59 at the base of the grit settlement tank 16 for removal from the site. The valve arrangement 76 associated with the collection region 72 may be operated manually or automatically.

In an alternative embodiment of the invention, the stone collection region may be provided in the inlet chamber 14, the inlet chamber 14 being provided with an appropriate valve arrangement to effect removal of stones and rocks collected within the stone collection region. Although it is preferable to include the transition channels 22,24 in the apparatus 8, the inlet chamber 14 may deliver the sewage flow directly to the screen arrangements 18,20. In this case, the stone collection region is conveniently formed in the inlet chamber 14. Alternatively, or in addition, the floor of the inlet channel 10 may be provided with a recess or depression (not shown) which provides a stone collection region for stones, rocks or other larger, solid materials carried by the sewage flow within the inlet channel 10. The inlet channel 10 may also be provided with a valve arrangement to permit collected stones or rocks to be delivered through an outlet pipe into the collection chamber for removal from the site. As the screen arrangements 18,20 are arranged within the grit settlement tank 16, rather than in the inlet channel 10, the provision of a depression or recess in the inlet chamber 10 does not give rise to an adverse build up of debris immediately upstream of the screen arrangements 18,20, as is the case in conventional arrangements.

The grit settlement tank 16 has considerably greater depth than the inlet channel 10. Thus, as illustrated in FIG. 5, by locating the screen arrangements 18,20 within the tank 16, a significantly increased screening area is presented to the sewage flow. The head loss, as indicated by $D_1$, can therefore be reduced significantly compared to conventional arrangements, in which the screen arrangement is located within the inlet channel. In conventional arrangements, only a limited screening area is presented to the sewage flow and the head loss, $D_2$, can therefore be significant (as shown in FIG. 6).

The present invention also provides the advantage that the stone collection region 72, upstream of the screen arrangement 18,20, can be provided within the inlet chamber 14 or the transition channels 22,24. In existing arrangements, where the screen arrangement is located in the inlet channel, a recess in the floor of the inlet channel may be used to provide a means of retaining stones or rocks. However, this form of stone-trap facility is difficult to access and cannot be maintained easily. Thus, the recess will eventually cease to provide an adequate stone-trapping function.

The grit settlement tank 16 and the outlet chamber 66 are covered by a floor covering, preferably made from steel sheeting, to enable operating personal to access different parts of the apparatus 8 for maintenance or operating purposes. Conveniently, the separation apparatus 62 and the washing apparatus 48 are supported on or above the floor covering. Thus, as can be seen most clearly in FIG. 1, as the walls of the grit settlement tank 16 and the outlet chamber 66 are formed from the same housing, and as the washing apparatus 48 and the separation apparatus 62 are arranged above the tank 16, a reduced installation space is required to accommodate the complete apparatus 8.

The periphery 78 of the tank 16 may be provided with a hand rail for safety purposes. The tank 16, including the inlet chamber 14, the inlet channel 10, the outlet chamber 66, the outlet channel 68 are preferably formed from steel. Other parts of the apparatus 8 may also be formed from steel, so as to simplify manufacture of the complete apparatus and reduce cost.

The apparatus 8 may also include a grease removal apparatus (not shown in the accompanying figures) located downstream of the screen arrangements 18,20, to effect removal of grease materials present within the sewage flow prior to discharge of the flow through the outlet channel 68. The grease removal apparatus may include a tank region, forming part of the outlet chamber 66, which is provided with a diffused air system for generating a turbulence effect within the sewage flow, thereby causing grease materials present in the screened sewage flow to rise to the surface of the flow. Typically, the grease removal apparatus includes a scraper board or plate for removing grease on the surface of the sewage flow and for discharging the removed products to a disposal point.

It is intended that the apparatus 8 can be handled as a unit. Thus, the apparatus 8 may be manufactured and constructed in a factory and then transported to the designated installation site. The apparatus 8 may be manufactured with any one or more of the various parts of the apparatus hereinbefore described, such as the washing apparatus 48, the separation apparatus 62, the grease removal apparatus or the grit pumping system, depending on the requirements of the customer. Alternatively, the apparatus may take the form of a relatively large-scale installation comprising a permanent concrete grit settlement tank and other permanent concrete structures, in which case it may be preferable to assemble the apparatus at the installation site.

It will be appreciated that a different number of screen arrangements to those shown in the accompanying figures may be included in the apparatus of the present invention depending on the sewage flow rates to be processed by the sewage treatment plant.

I claim:

1. An apparatus for use in a sewage treatment plant comprising a grit settlement tank having a settlement region within which grit carried by an input sewage flow settles, in use, an inlet channel for delivering an input sewage flow to the settlement tank, and a screen arrangement arranged entirely within the settlement tank, the screen arrangement having a continuous belt screen for capturing screenings contained within the sewage flow to enable their subsequent removal therefrom, the continuous belt screen having opposing, substantially vertical side walls which define a screening volume, wherein the settlement tank is of a relatively large volume compared with the screening volume to permit the input sewage flow to be retained within the tank for a sufficient period of time to enable grit to collect in the settlement region, thereby to aid its subsequent removal therefrom.

2. The apparatus as claimed in claim 1, wherein the settlement tank further comprises an inlet chamber, the input sewage flow being delivered to the inlet chamber by the inlet channel.

3. The apparatus as claimed in claim 2, wherein the inlet chamber is arranged to deliver the sewage flow directly to the screen arrangement.

4. The apparatus as claimed in claim 2, wherein the inlet chamber is arranged to deliver the sewage flow to the screen arrangement through a transition channel.

5. The apparatus as claimed in claim 4, wherein the transition channel has a transition channel floor, the transition channel floor being raised above the further floor of the settlement tank, a recess or depression being provided in the transition channel floor for retaining stones or rocks contained within the sewage flow.

6. The apparatus as claimed in claim 2, wherein the inlet chamber has a floor and the settlement tank has a further floor, the floor of the inlet chamber being raised above the further floor of the settlement tank.

7. The apparatus as claimed in claim 6, wherein the floor of the inlet chamber is provided with a recess or depression for retaining stones or rocks contained within the sewage flow prior to delivery of the flow to the screen arrangement.

8. The apparatus as claimed in claim 7, further comprising a valve arrangement for removing stones or rocks retained within the recess or depression.

9. The apparatus as claimed in claim 1, further comprising a gate arrangement for isolating the screen arrangement from the sewage flow.

10. The apparatus as claimed in claim 1, further comprising a removal apparatus for removing settled products, such as grit and small stones, from the settlement tank.

11. The apparatus as claimed in claim 10, wherein the removal apparatus takes the form of a pumping apparatus.

12. The apparatus as claimed in claim 10, further comprising a separation apparatus for separating products of different type which are removed from the settlement region.

13. The apparatus as claimed in claim 1, further comprising a washing apparatus for washing screenings removed from the sewage flow by the screen arrangement.

14. The apparatus as claimed in claim 1, wherein the settlement tank is provided with an outlet weir, over which screened sewage is discharged to an outlet chamber, the walls of the outlet chamber and the settlement tank being formed from the same housing.

15. The apparatus as claimed in claim 14, wherein the settlement tank and the outlet chamber are covered, and wherein a washing apparatus for washing screenings removed from the sewage flow by the screen arrangement is supported on or above the covering.

16. The apparatus as claimed in claim 14, wherein the settlement tank and the outlet chamber are covered, and wherein a separation apparatus for separating products of different type which are removed from the settlement region is supported on or above the covering.

17. The apparatus as claimed in claim 1, wherein the continuous belt screen is formed from a plurality of separate screen elements.

18. The apparatus as claimed in claim 17, wherein the grit settlement tank includes opposing substantially vertical side walls which are arranged to be substantially parallel to the opposing vertical side walls of the continuous belt screen.

19. The apparatus as claimed in claim 17, further comprising a removal apparatus for removing settled products, such as grit and small stones, from the settlement tank.

20. The apparatus as claimed in claim 19, further comprising a separation apparatus for separating products of different type which are removed from the settlement region.

* * * * *